United States Patent
Glassman et al.

(10) Patent No.: US 8,362,906 B1
(45) Date of Patent: Jan. 29, 2013

(54) REMOTE CONTROL DEVICE THAT USES COLOR TO INDICATE CHANGE IN STATUS

(75) Inventors: Ellen Tave Glassman, Closter, NJ (US); David Farrage, Demarest, NJ (US)

(73) Assignee: Sears Brands, L.L.C.

( * ) Notice: Subject to any disclaimer, the term of this patent is extended or adjusted under 35 U.S.C. 154(b) by 572 days.

(21) Appl. No.: 12/476,721

(22) Filed: Jun. 2, 2009

Related U.S. Application Data

(60) Provisional application No. 61/061,732, filed on Jun. 16, 2008.

(51) Int. Cl.
G08B 17/00 (2006.01)
H05B 6/50 (2006.01)

(52) U.S. Cl. .......................... 340/584; 219/714; 340/540

(58) Field of Classification Search .................. 219/200, 219/445.1, 714; 340/500, 584; 700/2, 45, 700/100, 211; 709/223; 345/82–84
See application file for complete search history.

(56) References Cited

U.S. PATENT DOCUMENTS

| | | | | |
|---|---|---|---|---|
| 4,131,786 A | * | 12/1978 | Cooper | 219/487 |
| 5,535,664 A | * | 7/1996 | Rokowski | 99/331 |
| 6,502,411 B2 | * | 1/2003 | Okamoto | 62/129 |
| 6,665,384 B2 | * | 12/2003 | Daum et al. | 379/102.03 |
| 6,729,147 B2 | * | 5/2004 | Lee | 62/131 |
| 7,102,688 B2 | | 9/2006 | Hayes et al. | |
| 7,143,214 B2 | | 11/2006 | Hayes et al. | |
| 7,248,239 B2 | * | 7/2007 | Dowling et al. | 345/83 |
| 7,634,918 B2 | * | 12/2009 | Kawaguchi et al. | 62/126 |
| 7,900,463 B2 | * | 3/2011 | Barone et al. | 62/157 |
| 2007/0273548 A1 | * | 11/2007 | No et al. | 340/870.01 |
| 2008/0295529 A1 | * | 12/2008 | Kawaguchi et al. | 62/126 |
| 2009/0282859 A1 | * | 11/2009 | Glielmo et al. | 62/440 |
| 2010/0283573 A1 | * | 11/2010 | Yum et al. | 340/3.1 |

* cited by examiner

Primary Examiner — Benjamin C Lee
Assistant Examiner — Sigmund Tang
(74) Attorney, Agent, or Firm — McAndrews, Held & Malloy, Ltd.

(57) ABSTRACT

A remote control device includes a memory having a library of commands for commanding functional operations of an appliance and a user interface having activatable keys for causing a transmission of one or more commands to thereby command functional operations of the appliance. An illumination device is provided which causes an appearance of the remote control device to change as a function of at least one of a timing operation and temperature related functional operation of the appliance.

5 Claims, 6 Drawing Sheets

Recharger Base

Unique Balance on Table

REMOTE CONTROL DEVICE THAT USES COLOR TO INDICATE CHANGE IN STATUS

RELATED APPLICATION

This application claims the benefit of U.S. Provisional Application No. 61/061,732, filed on Jun. 16, 2008, the disclosure of which is incorporated herein by reference in its entirety.

SUMMARY

The following relates to remote controls for use in remotely controlling functional operations of home appliances including gas and electric cooking appliances such as ranges, cooktops, wall ovens, microwaves; laundry appliances such as washers and dryers; home environment appliances such as vacuum cleaners, humidifiers, air purifiers, air conditioners, water heaters; and small kitchen appliances such as blenders, food processors, slow cookers, and outdoor cooking such as grills. The remote control may also include advanced functionality for operation of home appliances including lighting systems, security systems, thermostats, intercoms, and audio/video devices such as provided by PCs, home servers, TVs, DVD players, etc. The remote control may additionally include wireless access to such appliances, e.g., to provide two-way communications with such appliances, as well as the internet including websites and service sites for remote diagnostics and remote repair of such appliances. The internal components of the remote control may include the components shown in, for example, U.S. Pat. Nos. 7,143,214 and 7,102,688 which are incorporated herein by reference in their entirety, with the added feature that the subject remote control provides an illumination device which causes an appearance of the remote control to change as a function of at least one of a timing operation and a temperature related functional operation of an appliance that is controllable through use of the remote control.

A better understanding of the objects, advantages, features, properties and relationships of the subject remote control will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the subject remote control reference may be had to the following drawings in which.

DETAILED DESCRIPTION

With reference to the figures, a remote control 10 is provided which incorporates an illumination device, such as one or more lamps, LEDs, or the like, which illumination device is operable to change the appearance of the remote control. The appearance of the remote control may be changed by causing the illumination device to change colors in which the remote control, or portions thereof, are illuminated, by causing the illumination device to change the intensity or brightness in which the remote control, or portions thereof, are illuminated, or the like. In particular, the appearance of the remote control device is changed through use of the illumination device to reflect the status of a timing operation and/or the status of an appliance temperature related operation, e.g., an oven heating to a set temperature.

Figure 5A:
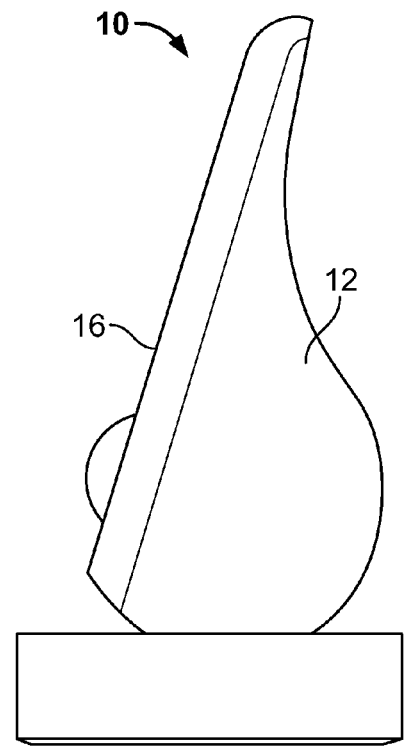
FIGS. 5a and 5b illustrate side views of the remote control of FIG. 4a or FIG. 4b docked in a recharging station and placed upon a table, respectively.
Figure 7A:
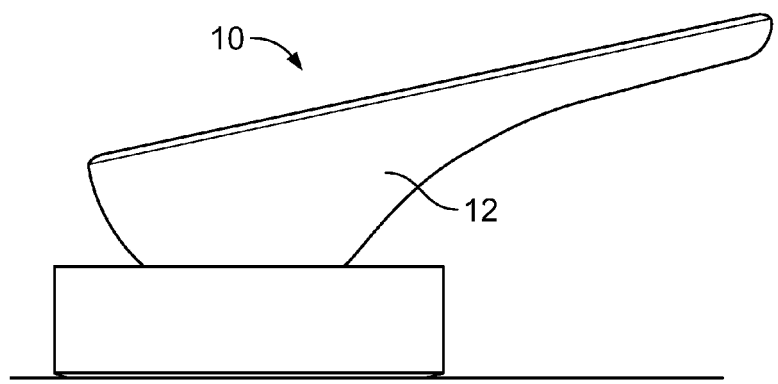
FIGS. 7a and 7b illustrate side views of the remote control of FIG. 6 docked in a recharging station and placed upon a table, respectively.

The remote control is constructed so as to have the ability to operate, monitor, and multi-task from anywhere in the home environment. To this end, the remote control includes, as described for example in U.S. Pat. No. 7,143,214, operating circuitry powered directly by a battery and/or indirectly from another electrical source (e.g., by way of the battery recharging contacts which mate with a battery recharging contacts of a base station as shown in FIGS. 5a and 7a). As is conventional, the operating circuitry preferably includes a memory (storing instructions and a library of appliance command codes), a processor 101 (for executing the instructions and controlling components, for measuring time intervals, etc.), a user interface (such as a liquid crystal display with a touch panel overlay, keys, and/or the like), an infrared (and/or RF) transmitter circuit, an infrared (and/or RF) receiver circuit 160, and a speaker or buzzer 102. In addition, the operating circuitry includes the illumination device which, under control of the processor, is functional to illuminate all or part of the remote control to reflect the status of a timing operation (as measured locally by the remote control) and/or the status of an appliance temperature related operation (as reported to the remote control by the appliance via the two-way communication link or as timed by the remote control).

As illustrated in the figures, the base 12 (or other part(s)) of the remote control 10 may be constructed from a translucent or transparent material and thus be illuminated, in whole or in part, by the illumination device. The illumination device may also, or in the alternative, function to illuminate, in whole or in part, the user interface 14 of the remote control 10. Still further, the illumination device may also, or in the alternative, function to illuminate, in whole or in part, the top 16 of the remote control 10 or any other remote control surface.

Figure 1:
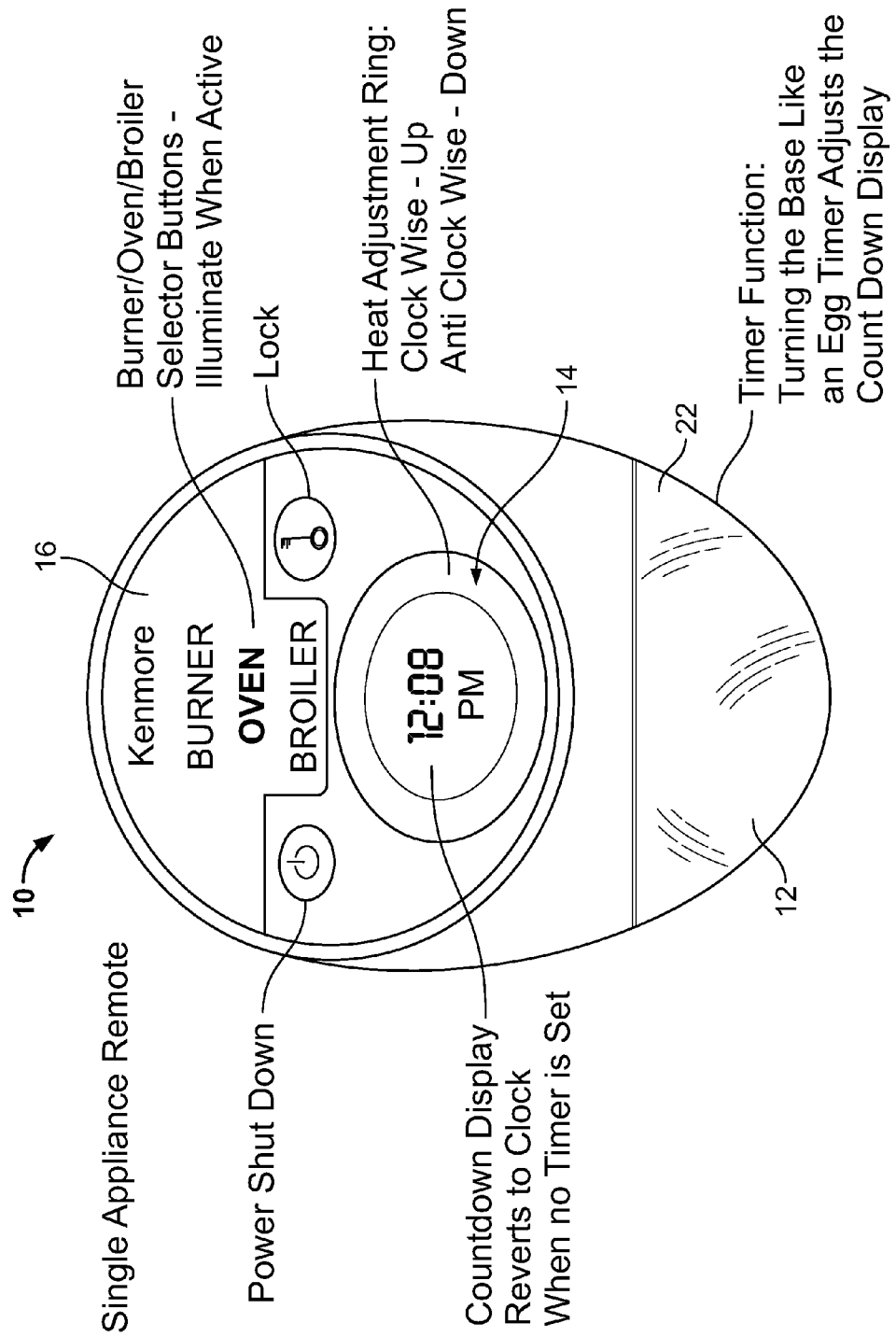
FIG. 1 illustrates a front view of an exemplary dedicated remote control incorporating an illumination device for causing an appearance of the remote control to change as a function of at least one of a timing operation and a temperature related functional operation of an appliance that is controllable through use of the remote control.

In certain embodiments, the remote control 10 is a dedicated remote control and is adapted to remotely control operations of a single appliance. For example, FIGS. 1 and 4a illustrate a dedicated remote control having a user interface 14 appropriate for the single device to be controlled, e.g., a remote control dedicated to controlling stove functions such as start, pause, repeat, temperature control, clock, burners, clock timer with countdown/alarm, etc. In certain other embodiment, the remote control can be used to operate multiple appliances, i.e., function as a universal remote control.

Figure 2:
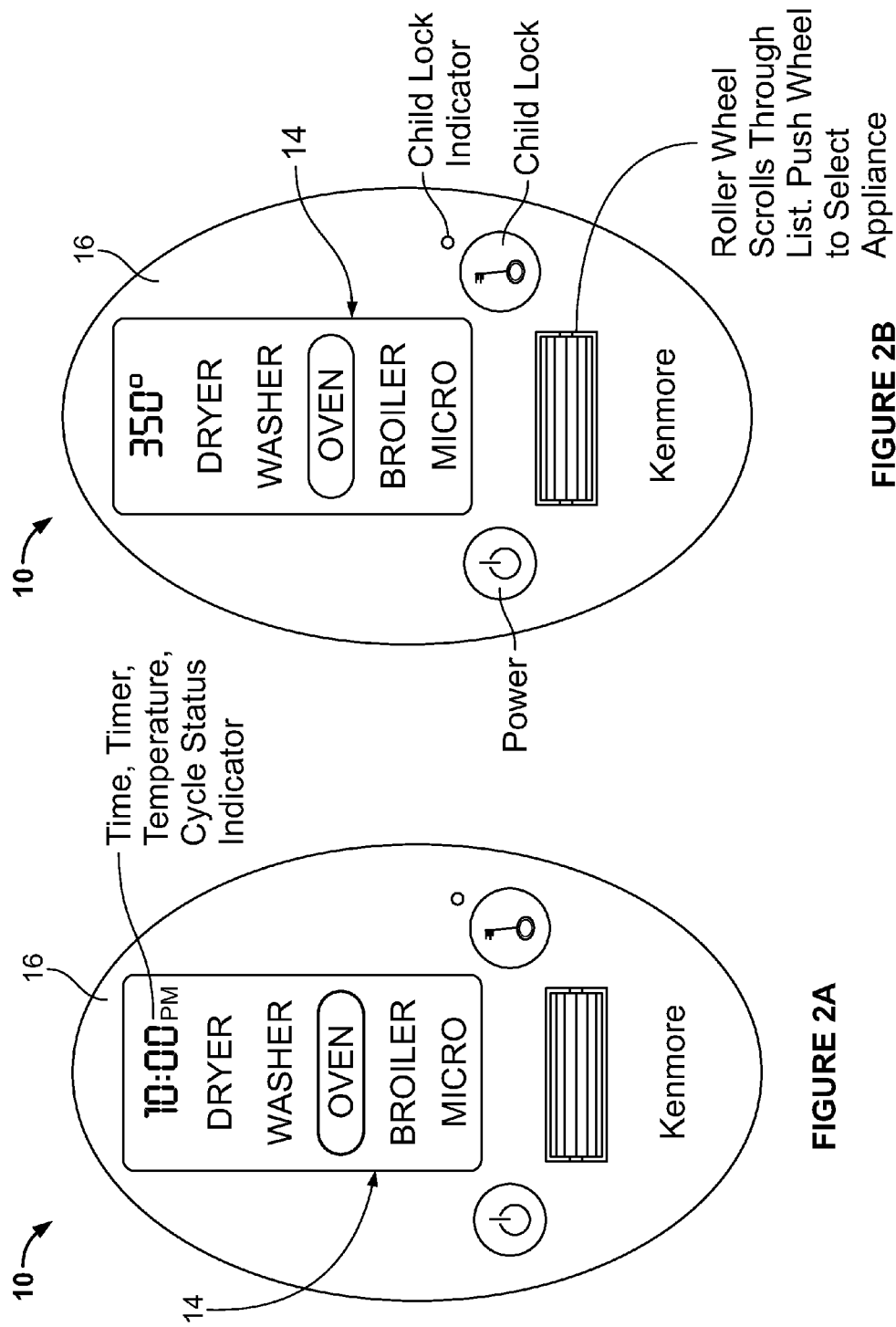
FIGS. 2a and 2b illustrate a top view of an exemplary universal remote control incorporating an illumination device for causing an appearance of the remote control to change as a function of at least one of a timing operation and a temperature related functional operation of an appliance that is controllable through use of the remote control.
Figure 4B:
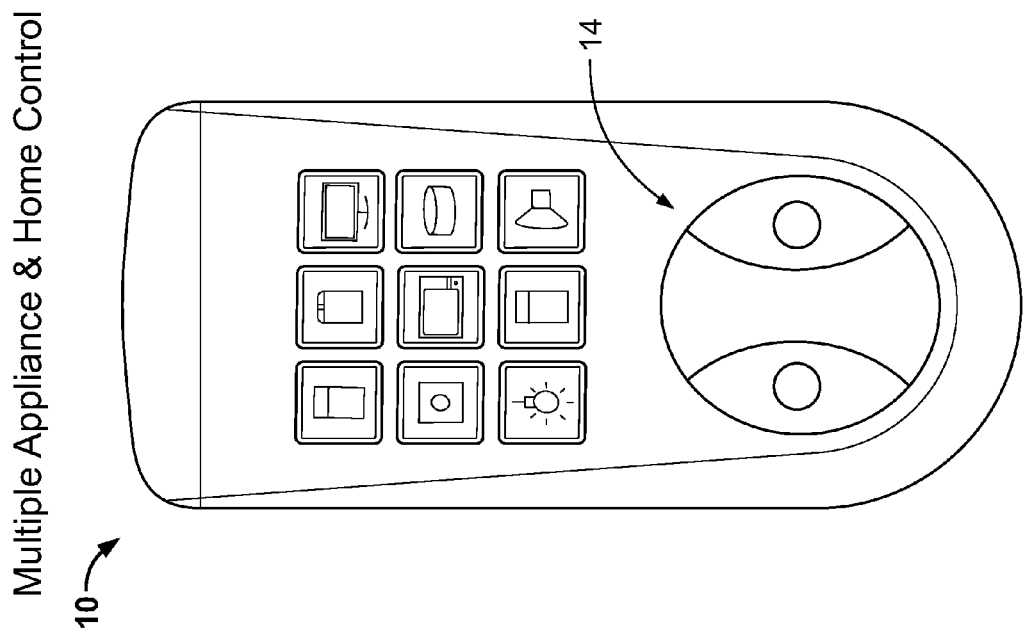
FIGS. 4a and 4b illustrate top views of further exemplary embodiments of the remote controls of FIGS. 1 and 2, respectively.
Figure 4A:
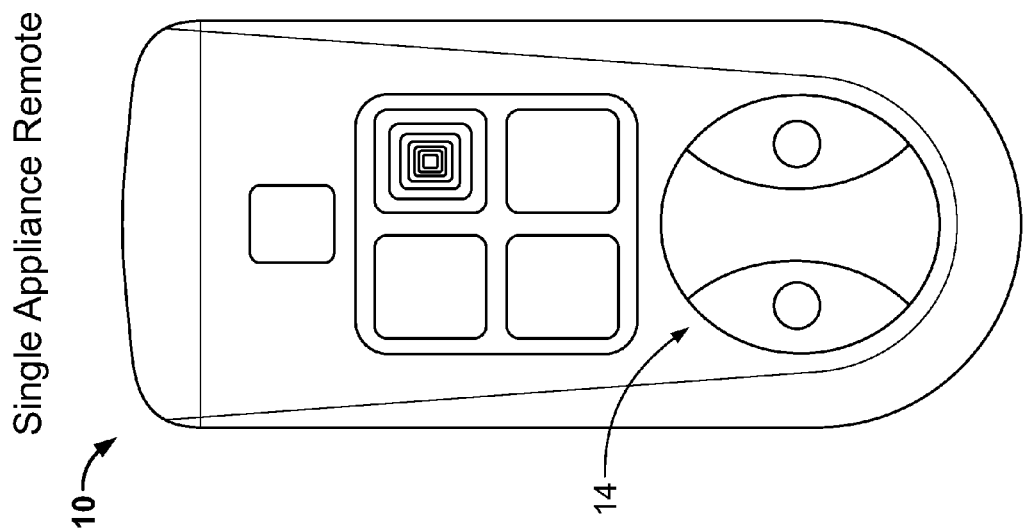

For example, FIGS. 2a, 2b, and 4b illustrate a universal remote control having a user interface 14 appropriate for each of multiple devices to be controlled such as a dryer, washer, oven, broiler, microwave oven, etc. In either case, the user interface 14 of the remote control may include one or more buttons, a touch screen, dials/knobs/track ball, a display, etc. for receiving user inputting and for presenting status, time display, prompts or alerts, etc. While the remote control 10 may include a speaker for alerts/alarms, more advanced sound capabilities can include a more robust speaker system for sound output such as playing of mp3s or digital music as well as for providing sound input/output to provide 2-way intercom "walkie-talkie" functionality, voice-activation of operations, and/or VOIP for remote communications such as use for servicing of appliances using remote diagnostics.

Figure 5B:
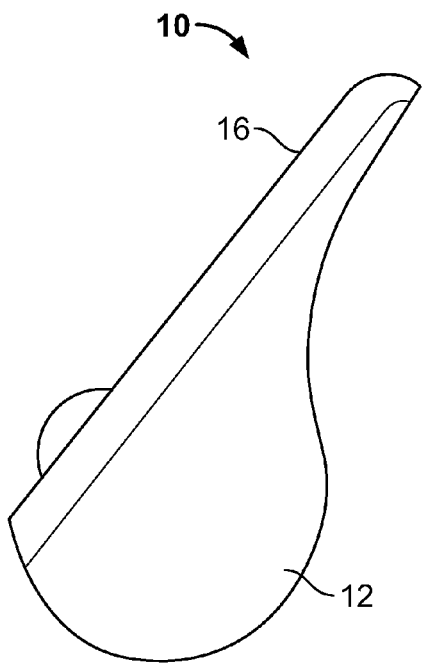
Figure 6:
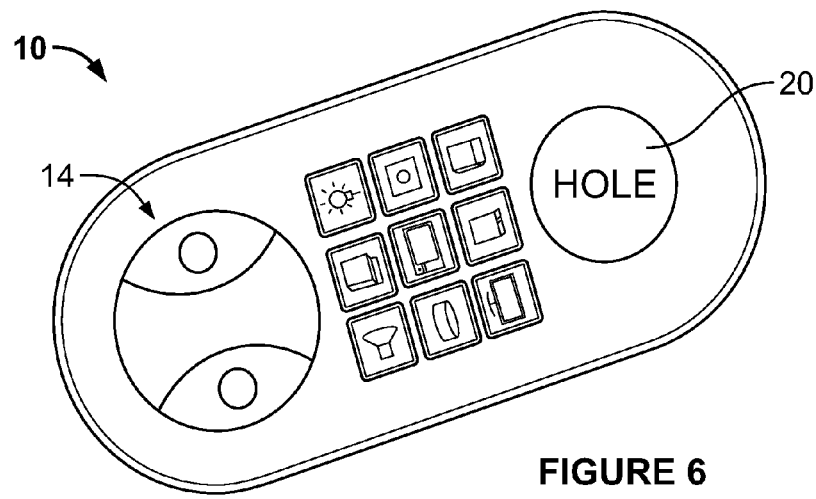
FIG. 6 illustrates a top view of a still further exemplary embodiment of the remote control of FIG. 2.
Figure 7B:
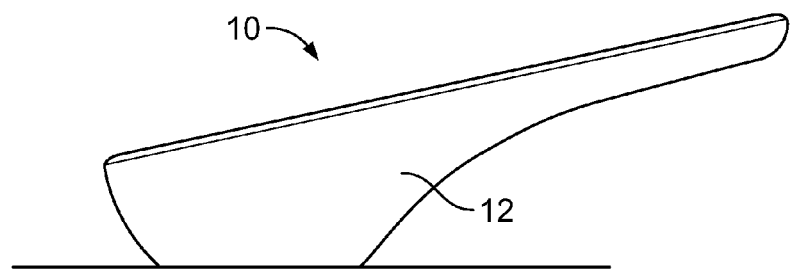

As also illustrated, for example in FIGS. 5b and 7b, the bottom 12 of the remote control 10 may be weighted and/or shaped to maintain the user interface of the remote control 10 in a viewable position, i.e., disposed in a non-horizontal position or otherwise angled towards the viewer, when the remote control 10 is placed upon a surface. The remote control 10 may also be provided with a means 20 for allowing the remote control 10 to be easily carried, such as a hole, hook, or the like formed in the remote control formed in the remote control body to thereby allow the remote control 10 to be carried by a belt or the like as illustrated in FIG. 6.

Figure 3:
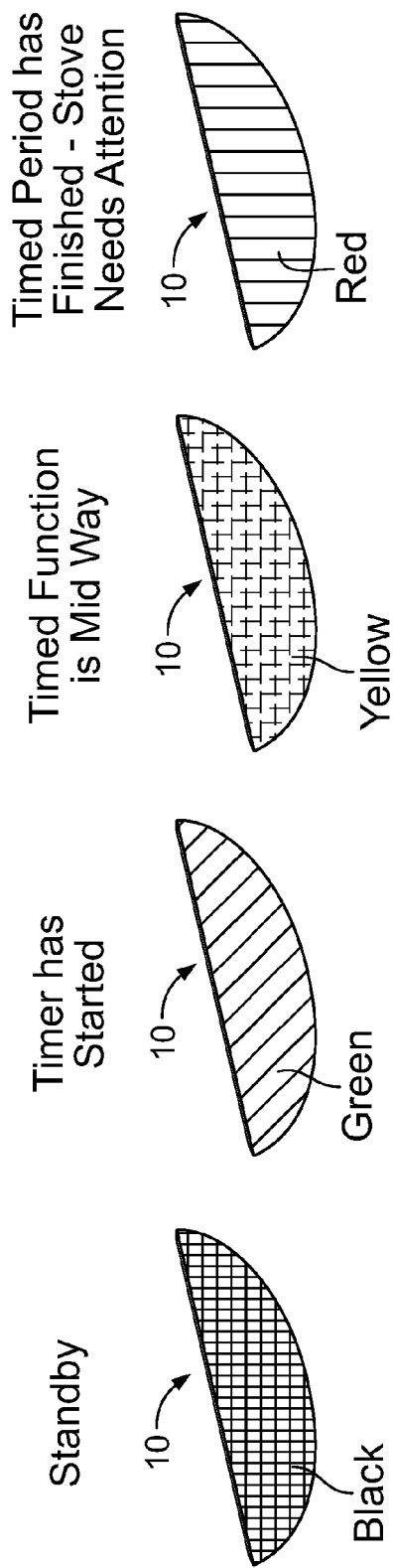
FIG. 3 illustrates an illumination device being used to cause the appearance of a remote control to change as a function of a timing operation.

As noted, the design of the remote control 10 include the use of light to show status of timing and/or temperature operations. For example, as illustrated in FIG. 3, the illumination device, which may be multiple colored LEDs or a multi-colored LED, can cause part or the entirety of the remote control 10 to change color to indicate how much time is left in a timing operation. To this end, the remote control 10 is provided with an ability to set a time to be measured, for example by means of buttons on the user interface 14, by turning an egg-timer like dial 22, or the like. In this manner, as an example, the remote control 10 can be un-illuminated (e.g., black) when not timing and be caused to glow a green color at the start of a timed operation and conclude with a red color when the timed operation is completed while transitioning through other colors such as yellow. Similarly, by receiving messages from an appliance, the remote control 10 can be un-illuminated (e.g., black) when an appliance is not warming and be caused to glow a green color at the start of an appliance temperature setting operation and conclude with a red color when the appliance temperature setting operation is completed while transitioning through other colors such as yellow.

While the foregoing describes various embodiments of the invention in detail, it will be appreciated by those skilled in the art that various modifications and alternatives to those details could be developed in light of the overall teachings of the disclosure. For example, rather than change colors to indicate changing status of time or temperature operations, the illumination device can be used to illuminate the remote control, or parts thereof, with ever increasing or decreasing intensity/brightness to this same end. Accordingly, the particular arrangements disclosed are meant to be illustrative only and not limiting as to the scope of the invention which is to be given the full breadth of the appended claims and any equivalents thereof.

What is claimed is:

1. A remote control device, comprising:
   a memory having a library of commands for commanding functional operations of an appliance;
   a user interface having activatable keys for causing a transmission of one or more commands to thereby command functional operations of the appliance; and
   an illumination device which causes an appearance of the remote control device to change by causing the illumination device to change illumination colors or light intensities, as a function of a temperature related functional operation of the appliance,
   wherein the remote control device is adapted for two-way communication with the appliance, the appliance providing the remote control temperature related information, and the remote control using the temperature related information to control the illumination device to thereby cause the appearance of the remote control device to change as a function of the temperature related functional operation of the appliance.

2. The remote control device of claim 1, wherein the two-way communication comprises a wireless RF communication channel.

3. The remote control device as recited in claim 1, comprising a speaker for outputting an alarm.

4. A remote control device, comprising:
   a memory having a library of commands for commanding functional operations of an appliance; a user interface having activatable keys for causing a transmission of one or more commands to thereby command functional operations of the appliance; and
   an illumination device which causes an appearance of the remote control device to change by causing the illumination device to change illumination colors or light intensities, as a function of a timing operation of the appliance,
   wherein the remote control device is adapted for two-way communication with the appliance, the appliance providing to the remote control timing operation information and the remote control using the timing operation information to control the illumination device to thereby cause the appearance of the remote control device to change as a function of the timing functional operation of the appliance.

5. The remote control device as recited in claim 4, comprising a speaker for outputting an alarm.

* * * * *

UNITED STATES PATENT AND TRADEMARK OFFICE
CERTIFICATE OF CORRECTION

| | |
|---|---|
| PATENT NO. | : 8,362,906 B1 |
| APPLICATION NO. | : 12/476721 |
| DATED | : January 29, 2013 |
| INVENTOR(S) | : Glassman et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this
Twentieth Day of August, 2013

Teresa Stanek Rea
*Acting Director of the United States Patent and Trademark Office*